Dec. 23, 1924.
O. VETSCH
1,520,266
CONVERTIBLE PITCHFORK AND RAKE
Filed Feb. 1, 1924
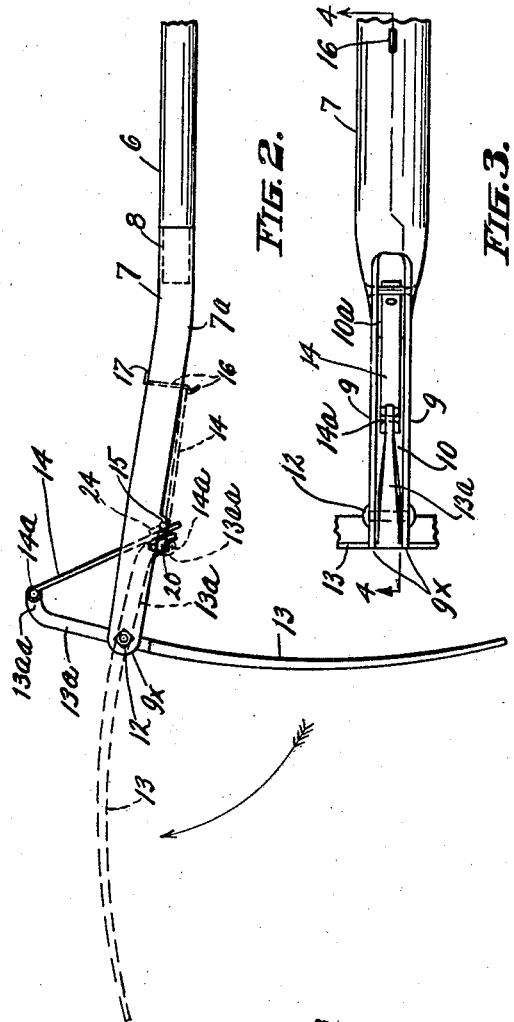
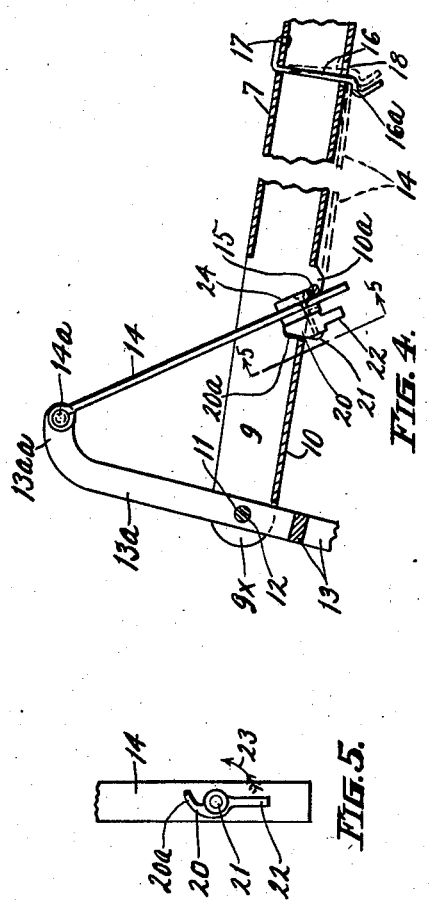
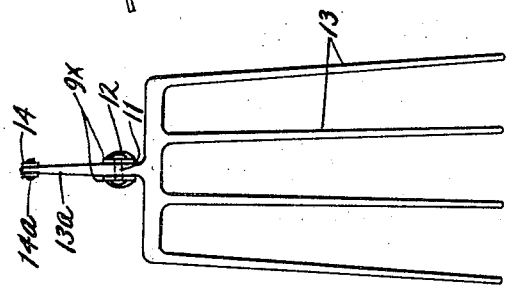
INVENTOR:
Othmar Vetsch
BY A. M. Carlsen
ATTORNEY.

Patented Dec. 23, 1924.

1,520,266

UNITED STATES PATENT OFFICE.

OTHMAR VETSCH, OF ALBERTVILLE, MINNESOTA.

CONVERTIBLE PITCHFORK AND RAKE.

Application filed February 1, 1924. Serial No. 690,077.

*To all whom it may concern:*

Be it known that I, OTHMAR VETSCH, a citizen of the United States, residing at Albertville, in the county of Wright and State of Minnesota, have invented certain new and useful Improvements in Convertible Pitchforks and Rakes, of which the following is a specification.

My invention relates to agricultural implements and more particularly to a pitchfork adaptable for the usual purposes of handling hay, grain in the sheaf, straw, manure, etc., and also adaptable as a rake for facilitating the handling of such articles.

The object is to provide a simple, inexpensive and convenient implement in which is combined the usefulness of two or more implements hitherto required for handling grain, straw and the like.

In the accompanying drawing:

Fig. 1 is a front elevation of my improved pitchfork showing the fork in position to be used as a rake.

Fig. 2 is a side elevation of Fig. 1 showing also the position of the fork, in dotted lines, when used as a regular pitchfork.

Fig. 3 is an enlarged top view of the left portion of Fig. 2 showing only a small part of the fork.

Fig. 4 is a sectional view as on line 4—4 in Fig. 3.

Fig. 5 is an enlarged detail, or face view, of the rear end of the fork locking arm of my device about as on line 5—5 in Fig. 4.

Referring to the drawing by reference numerals, 6 designates the usual wooden pitchfork handle. The front end of said handle may be reduced as at 8 and driven into the rear end of a tubular, metallic member 7 to hold them together permanently. Various other means (not shown) may be used for the same purpose.

The tube 7 may be bent some at $7^a$ and its forward end projects thence forwardly at an angle, the walls of this part of the tube being flattened longitudinally to form two transversely spaced, parallel bars 9 the lower edges of which are connected by an integral web 10 (Fig. 4) but their upper edges are not united, their extreme forward ends forming a bifurcation $9^x$. In said bifurcation I provide registering apertures 11 for a bolt 12 pivotally engaged by a central rocker arm extension $13^a$ of a pitchfork 13. The extremity of arm $13^a$ is pivotally engaged as at $14^a$ by an elongated metal bar 14 which will hereinafter be called the locking bar. The latter bar extends rearwardly at all times from its pivot, down between walls 9, through an aperture $10^a$ in web 10 in freely slidable contact with a transversely arranged pin 15 fixed in position across said aperture. The pivot arm $13^a$ of the fork is preferably arched rearwardly at its upper end, as at $13^{aa}$ in Figs. 2 and 4, for a purpose to be described.

In the use of my device, as a pitchfork, the fork 13 extends linearly forward from the bolt 12 as indicated in dotted lines in Fig. 2. When in this position the rocker arm $13^a$ lies entirely within and between walls 9 and web 10 of the tube 7, its arched end $13^{aa}$ protruding downwardly through aperture $10^a$. The lock bar 14 is then of course entirely outside of and below the web 10 and may be swung up against the under side of said web so that its free end can engage and be held by the shoulder $16^a$ of a spring catch 16. I have shown a desirable form of such spring catch consisting of a piece of spring wire secured as at 17 in the upper side of the tube 7, thence extending downwardly through a slot 18 in the lower side of the tube 7, its protruding end having the shoulder described. Said spring normally tends to spring forward into engagement with the end of bar 14 and the latter may of course be released by pushing the exposed end of the spring rearwardly.

It is well known that in cases such as cleaning barns, haying, etc., a common pitchfork must often be used as a rake to gather in stray straws and the like, and as this is a cumbersome manipulation of a pitchfork a rake is often kept handy for this purpose only. My device is readily convertible in a very serviceable rake by simply releasing the lock bar 14, then turning the fork on its pivot bolt 12 to a position at about right angles to the tube 7, this movement causing bar 14 to be drawn upwardly through aperture $10^a$ until only a small part of its free end protrudes below said aperture. On said latter end of the lock bar 14 I provide means for locking it so that the fork 13 may be rigidly held in said angular position. Said locking means consist preferably of an eccentric cam 20 pivoted as at 21 on the lock bar and having a finger lever 22. The cam has an eccentric sloping face $21^a$ (see Figs. 4 and 5) adapted to engage the web 10 at the forward end of aperture 10ª and the wedging action caused by turning the lever 22 wedges the cam and bar 14 between pin 15 and web 10, said bar being thereby securely locked and holding the fork 13 in its proper angular position for raking purposes. The cam action described is similar to the action of a window sash fastener. By turning the cam lever 22 in the opposite direction, as indicated by arrow 23 in Fig. 5, the bar 14 is released and the fork 13 may be swung back to its position for use as a regular pitchfork.

24 is a small block welded or otherwise secured on the rear side of bar 14 in such position that when the fork is used for raking purposes (see Fig. 4) one end of said block engages the pin 15 and prevents accidental escape of the bar from its locked position.

What I claim is:

1. In a pitchfork of the class described, an elongated handle, a fork pivotally secured in one end of said handle, means pivotally secured to said fork and operatively connected with the handle to hold the fork in either of two selective positions relative to the said handle, the forward end of said handle comprising a metallic extension mainly U-shaped in cross section and a bifurcation at its extremity, a central arm extension on said fork in a plane with its tines and pivotally secured in said bifurcation, a lock bar pivotally secured with one end to the extremity of said fork extension and extending into the U-shaped part of the handle and thence through an aperture therein, said means for holding the fork in angular relation to the handle comprising a cam pivotally secured to the lock bar and adapted to frictionally engage the handle at one end of said aperture.

2. The structure specified in claim 1, in which said fork arm is arched at its extremity, said arched portion adapted to protrude through said aperture in the handle when the fork is swung to a position in linear relation to the handle.

In testimony whereof I affix my signature.

OTHMAR VETSCH.